(12) United States Patent
Koide

(10) Patent No.: US 6,529,228 B1
(45) Date of Patent: Mar. 4, 2003

(54) LASER WORKING METHOD, METHOD FOR PRODUCING INK JET RECORDING UTILIZING THE SAME, AND INK JET RECORDING METHOD PRODUCED BY SUCH METHOD

(75) Inventor: June Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/604,416

(22) Filed: Jun. 27, 2000

(30) Foreign Application Priority Data

Jun. 30, 1999 (JP) .......................... 11-184642
Jun. 30, 1999 (JP) .......................... 11-184674
Jun. 22, 2000 (JP) .......................... 2000-187657

(51) Int. Cl.[7] .............................................. B41J 2/435
(52) U.S. Cl. .................................................... 347/224
(58) Field of Search .......................... 347/45, 47, 40, 347/224, 144; 29/890.1; 219/121.4, 121.68, 121.69, 121.7, 121.71; 505/410, 412

(56) References Cited

U.S. PATENT DOCUMENTS 5,208,604 A  5/1993 Watanabe et al. ............ 347/47
5,930,895 A * 8/1999 Orikasa et al. ............ 29/890.1
6,156,030 A * 12/2000 Neev ............................ 606/10
6,172,329 B1 * 1/2001 Shoemaker et al. ..... 219/121.69

FOREIGN PATENT DOCUMENTS

JP  2-121842  5/1990
JP  2-121845  5/1990

* cited by examiner

*Primary Examiner*—Hai Pham
(74) *Attorney, Agent, or Firm*—Fitzpatrick, Cella, Harper & Scinto

(57) ABSTRACT

The invention provides a laser working method free from generation of by-products and capable of preventing accumulation of thermal energy generating during the laser working, in a workpiece made, for example, of a resinous material, thereby precisely reproducing a minute mask pattern, also a method for producing an ink jet recording head utilizing such a laser working method and an ink jet recording head produced by such a producing method. There is employed laser light in more than one pulse having a very high energy density in space and time, as emitted from a laser oscillator that can oscillate with a pulse radiation time not exceeding 1 picosecond, and a speckle interference image generated by light diffraction at the passing of the laser light through the mask pattern is dynamically changed to form an integrated image of the speckle interference image, whereby a pattern substantially the same as the mask pattern can be formed.

22 Claims, 2 Drawing Sheets

LASER WORKING METHOD, METHOD FOR PRODUCING INK JET RECORDING UTILIZING THE SAME, AND INK JET RECORDING METHOD PRODUCED BY SUCH METHOD

BACKGROUND OF THE INVENTION

1. Field of the Invention

The present invention relates to a laser working method for example a method for producing by such a laser working method an ink jet recording head for discharging an ink droplet and depositing such ink droplet on a recording medium, and an ink jet recording head produced by such a method. In particular, the present invention relates to a laser working method capable of working a worked article without fusion or thermal expansion therein and capable of precisely working a fine mask pattern in mask projection, a method for producing an ink jet recording head by such a laser working method, and an ink jet recording head thus produced.

2. Related Background Art

For minute working of a structured article requiring a fine structure and high precision, a laser working method employing an ultraviolet laser has been employed.

Such minute working can be exemplified by working of ink flow paths and ink discharge ports of an ink jet recording head.

The Japanese Patent Application Laid-Open No. 2-121842 or No. 2-121845 discloses high precision working of forming ink flow paths and ink discharge ports with an excimer laser which is a representative ultraviolet laser.

The excimer laser is capable of emitting ultraviolet light of a short pulse (15 to 35 ns) by discharge excitation of mixed gas of rare gas and halogen gas, with an oscillation energy of several hundred mJ/pulse and a pulse repeating frequency of 10 to 500 Hz. When the polymer resin surface is irradiated with a short-pulsed ultraviolet light of such high intensity, there is generated an ablative photodecomposition (APD) process in which the irradiated portion instantaneously decomposes and scatters with a plasma light emission and an impact sound, whereby so-called laser ablation working of polymer resin is made possible.

Among the conventional lasers employed for such working, the widely employed YAG laser can form a hole, but generates a coarse edge face, while the $CO_2$ laser emitting infrared light is associated with a drawback of generating a crater around the formed hole. Such laser working methods are thermal working methods in which the working is achieved by converting optical energy into thermal energy, so that the shape of the worked article is often lost and fine working is difficult to achieve. On the other hand, the laser ablation working utilizing the excimer laser, based on sublimation etching by a photochemical reaction breaking the covalent bond of carbon atoms, does not easily break the shape of the worked article and can therefore achieve working of very high precision.

The laser ablation working method means a working method by sublimation, not through a liquid phase, by a laser.

Particularly in the field of ink jet technology, it is fresh in memory that the technology has undergone a remarkable progress to the present state by the adoption of the laser ablation working technology utilizing such excimer laser.

With the practical adoption of such laser working technology with excimer laser, there have been found the following phenomena.

The pulse oscillation time of the irradiating laser is about several ten nanoseconds in case of the excimer laser which is an ultraviolet laser or about 100 picoseconds to several nanoseconds in case of the YAG laser, but all the laser light falling on an article is not consumed for cleaving the covalent bonds of the atoms.

Because of the presence of such optical energy not consumed in cleaving the covalent bonds of the atoms, the laser worked portion of an article scatters before being completely decomposed, thereby forming by-products around the working area.

A part of the optical energy not consumed in cleaving the covalent bonds of the atoms is converted into thermal energy.

Also, as the energy density of the excimer laser remains at the level of 100 megawatts at maximum in the oscillation pulse, the subliming ablation working is not easily applicable to the materials of high thermal conductivity such as metals, ceramics or mineral substances (such as silicon) or materials of low light absorption such as quarts or glass, and can be principally employed for organic resinous materials.

These phenomena are unavoidable in using the excimer laser, and various technologies have been proposed to avoid the influences of these phenomena on the actual ink jet head.

For example a step of removing the by-products is executed, since the ink discharge ports may be clogged if the ink jet recording head is assembled while such by-products still remain.

Also, as the conversion of part of optical energy into thermal energy may cause thermal expansion or partial fusion of an article in the course of working, a material of a high glass transition point or a reduced working pitch is employed.

Since these technologies do not fundamentally resolve these phenomena, various limitations are practically imposed in the laser working.

On the other hand, a higher definition in the image quality is being required for the ink jet recording head, and the density of arrangement of the ink discharge ports or the ink flow paths, which has conventionally been in a range of from 300 to 400 dpi, is now required to be increased to 600 dpi, or even 1200 dpi.

Therefore, there is a demand for a method capable of forming the discharge ports and the ink flow paths with a small pitch or a small dimension, such as an arrangement pitch of 50 $\mu$m or less and a working diameter of 20 $\mu$m or less, with a high precision.

However the above-mentioned phenomena associated with the excimer laser become more conspicuous as the working pitch or the working diameter becomes smaller, and are posing limitations in producing the ink jet head of high precision as mentioned above.

In consideration of the foregoing, the present inventors, having recognized that the aforementioned phenomena are ascribale to the laser ablation working utilizing the ultraviolet laser exemplified by the excimer laser, have made intensive investigations not restricted in the field of the conventional technologies and have reached a novel laser ablation technology that is capable of fundamentally resolving these phenomena, also adapting to the minute working technologies ever advancing hereafter and also expanding the adaptability to various applications.

SUMMARY OF THE INVENTION

The present invention was made in view of the foregoing. An -object of the present invention is to provide a laser working method free from generation of by-products and fundamentally avoiding accumulation of thermal energy, generated in the course of laser working, in an article such as a resinous material (generally called "workpiece"), thereby achieving highly precise working without fusion or thermal expansion of the article, a method for producing an ink jet recording head utilizing such laser working method, and an ink jet recording head produced by such producing method.

Another object of the present invention is to provide a laser working method capable of forming a minute structure in an article composed of plural materials by a simple working step, a method for producing an ink jet recording head utilizing such laser working method, and an ink jet recording head produced by such producing method.

Still another object of the present invention is to provide a laser working method capable of simplifying an alignment step, improving the precision such as the positional precision of an internally structured member and reducing the manufacturing cost, a method for producing an ink jet recording head utilizing such laser working method, and an ink jet recording head produced by such producing method.

Still another object of the present invention is to provide a laser working method capable of improving the working efficiency by constructing an article so as to absorb the radiation energy of laser, a method for producing an ink jet recording head utilizing such laser working method, and an ink jet recording head produced by such producing method.

The above-mentioned objects can be attained, according to the present invention, by a laser working method, a method for producing an ink jet recording head utilizing such laser working method, and an ink jet recording head produced by such producing method, featured as described in the following items (1) to (30):

(1) A laser working method for carrying out laser ablation working on an article by irradiating the article with laser light, which comprises, in working by projecting the laser light on a mask pattern, employing the laser light in a plurality of pulses having a very high energy density in space and time, as emitted from a laser oscillator that can oscillate with a pulse emission time not exceeding 1 picosecond, and dynamically changing a speckle interference image generated by light diffraction at the passing of the laser light through the mask pattern, thereby forming an integrated image of the speckle interference image and producing a pattern substantially the same as the mask pattern.

(2) A laser working method according to item (1), wherein the mask is displaced and vibrated in the direction of the optical axis to form the integrated image of the speckle interference image on the surface of the article.

(3) A laser working method according to item (2), wherein the displacement vibration of the mask is effected by a vibration actuator.

(4) A laser working method according to item (1), wherein the integrated image of the speckle interference image is formed on the surface of the article, by inserting a wavelength plate having a slope of at least from $0\lambda$ to $\lambda/2$ between the mask and a projection lens or between the projection lens and the article and carrying out laser irradiation while moving the wavelength plate so that light polarization is changed.

(5) A laser working method according to any of items (1) to (4), wherein a wavelength of the laser light is within a range of from 350 to 1000 nm.

(6) A laser working method according to any of items (1) to (5), wherein a pulse radiation time of the laser light is not more than 500 femtoseconds.

(7) A laser working method according to any of items (1) to (6), wherein the article is composed of a resinous material, Si or a Si compound.

(8) A laser working method according to any of items (1) to (7), wherein the laser oscillator is provided with a light propagation space compressing device.

(9) A laser working method according to item (8), wherein the light propagation space compressing device is composed of a chirping pulse generation means and a vertical mode synchronization means utilizing light wavelength dispersion characteristics.

(10) A method for producing an ink jet recording head comprising an ink discharge port for discharging an ink droplet to be deposited on a recording medium, a liquid chamber containing ink to be supplied to the ink discharge port, an ink flow path for communicating the liquid chamber with the ink discharge port, an energy generation element provided in a part of the ink flow path and generating energy for ink discharge, and an ink supply aperture for supplying ink from the outside to the liquid chamber, in which a member constituting at least a part of the ink passages of the ink jet recording head is worked by laser working, wherein:

in projecting laser light on a mask pattern, the laser working is carried out by using the laser light in a plurality of pulses having a very high energy density in space and time, as emitted from a laser oscillator that can oscillate with a pulse emission time not exceeding 1 picoseconds, and a speckle interference image generated by light diffraction at the passing of the laser light through the mask pattern is dynamically changed, thereby forming an integrated image of the speckle interference image and producing a pattern substantially the same as the mask pattern.

(11) A method for producing an ink jet recording head according to item (10), wherein the mask is displaced and vibrated in the direction of the optical axis to form the integrated image of the speckle interference image on the surface of the ink jet recording head.

(12) A method for producing an ink jet recording head according to item (11), wherein the displacement vibration of the mask is effected by a vibration actuator.

(13) A method for producing an ink jet recording head according to item (10), wherein the integrated image of the speckle interference image is formed on the surface of the ink jet recording head, by inserting a wavelength plate having a slope of at least from $0\lambda$ to $\lambda/2$ between the mask and a projection lens or between the projection lens and the ink jet recording head and carrying out laser irradiation while moving the wavelength plate so that light polarization is changed.

(14) A method for producing an ink jet recording head according to items (10) to (12), wherein a plurality of recesses or penetrating holes constituting a part of the ink passage is formed simultaneously at a predetermined distance by laser light irradiation through a mask with a pattern having a plurality of apertures formed with a predetermined pitch.

(15) A method for producing an ink jet recording head according to item (14), wherein the recess is a groove to form the ink flow path.

(16) A method for producing an ink jet recording head according to item (14), wherein the penetrating hole is to form the discharge port.

(17) A method for producing an ink jet recording head according to any of items (10) to (16), wherein the wavelength of the laser light is within a range of from 350 to 1000 nm.

(18) A method for producing an ink jet recording head according to any of items (10) to (17), wherein a pulse radiation time of the laser light is not more than 500 femtoseconds.

(19) A method for producing an ink jet recording head according to any of items (10) to (18), wherein a member constituting at least a part of the ink passage including the discharge port, ink flow path, liquid chamber and ink supply aperture is composed of a resinous material.

(20) A method for producing an ink jet recording head according to any of items (10) to (18), wherein a member constituting at least a part of the ink passage including the discharge port, ink flow path, liquid chamber and ink supply aperture is composed of Si or a Si compound.

(21) A method for producing an ink jet recording head according to any one of items (10) to (20), wherein the laser oscillator is provided with a light propagation space compressing device.

(22) A method for producing an ink jet recording head according to item (21), wherein the light propagation space compressing device is composed of a chirping pulse generation means and a vertical mode synchronization means utilizing light wavelength dispersion characteristics.

(23) An ink jet recording head comprising an ink discharge port for discharging an ink droplet to be deposited on a recording medium, a liquid chamber containing ink to be supplied to the ink discharge port, an ink flow path for communicating the liquid chamber with the ink discharge port, an energy generation element provided in a part of the ink flow path and generating energy for ink discharge, and an ink supply aperture for supplying ink from the outside to the liquid chamber, in which a member constituting at least a part of the ink flow passages of the ink jet recording head is worked by laser working, wherein:

in projecting laser light on a mask pattern, the laser working is carried out by using the laser light in a plurality of pulses having a very high energy density in space and time, as emitted from a laser oscillator that can oscillate with a pulse emission time not exceeding 1 picosecond, and a speckle interference image generated by light diffraction at the passing of the laser light through the mask pattern is dynamically changed, thereby forming an integrated image of the speckle interference image and working the member.

(24) An ink jet recording head according to item (23), having the member worked by displacing and vibrating the mask by a vibration actuator in the direction of the optical axis, thereby forming the integrated image of the speckle interference image on the worked surface of a workpiece.

(25) An ink jet recording head according to item (24), having the member worked by forming the integrated image of the speckle interference image on the surface of a workpiece, by inserting a wavelength plate having a slope of at least from $0\lambda$ to $\lambda/2$ between the mask and a projection lens or between the projection lens and the workpiece and carrying out laser irradiation while moving the wavelength plate so that light polarization is changed.

(26) An ink jet recording head according to items (23) to (25), wherein a plurality of recess or penetrating holes constituting a part of the ink passage is formed simultaneously at a predetermined distance by laser light irradiation through mask having a pattern of plural apertures formed with a predetermined pitch.

(27) An ink jet recording head according to item (26), wherein the recess is a groove to form the ink flow path.

(28) An ink jet recording head according to item (26), wherein the penetrating hole is to form the discharge port.

(29) An ink jet recording head according to any one of items (24) to (28), wherein a member constituting at least a part of the ink passage including the discharge port, ink flow path, liquid chamber and ink supply aperture is composed of a resinous material.

(30) An ink jet recording head according to any one of items (24) to (28), wherein a member constituting at least a part of the ink passage including the discharge port, ink flow path, liquid chamber and ink supply aperture is composed of Si or a Si compound.

DETAILED DESCRIPTION OF THE PREFERRED EMBODIMENTS

Figure 1:
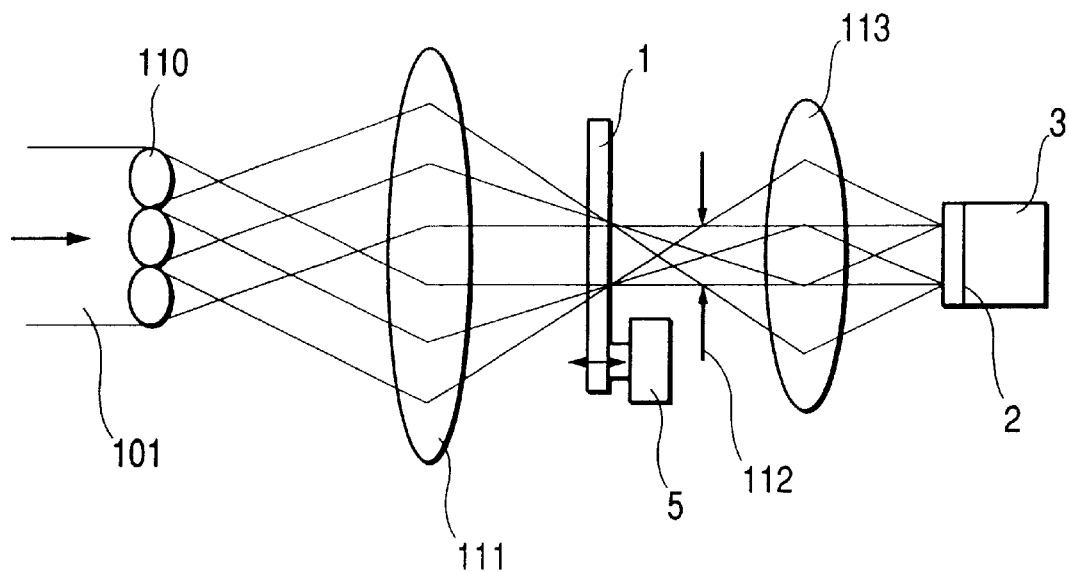
FIG. 1 is a schematic view showing the optical path of a photomask pattern projecting optical system in a laser working apparatus in an embodiment 1 of the present invention.

Through the application of the aforementioned constitution of the present invention, embodiments thereof can realize the laser working method capable of achieving a higher definition, also avoiding generation of by-products and fundamentally preventing accumulation of thermal energy generated in the course of laser working, in the article composed of, for example, a resinous material, a method for producing an ink jet recording head utilizing such a laser working method, and an ink jet recording head produced by such a producing method. Also in mask projection working, by providing a means for dynamically displacing interference of a projected image in the optical path for guiding the laser light to the article, there can be realized a laser working method capable of precisely producing a minute mask pattern, a method for producing an ink jet recording head utilizing such a laser working method, and an ink jet recording head produced by such a producing method.

The laser light in a plurality of pulses employed in the aforementioned constitution of the present invention and having a very high energy density in space and time, as emitted from a laser oscillator that can oscillate with a pulse radiation time not exceeding 1 picosecond is so-called femtosecond laser, which is described, for example, in the "Next generation optical technology summary" (published by Optronics Co. in 1992; Part 1 Elementary technologies: generation and compression of ultra short pulses; pp 24 to 31), and, among the currently commercially available femtosecond lasers, some have a pulse radiation time not exceeding 150 femtoseconds and an optical energy of 500 microjoules per pulse. With such lasers, the energy density of the emitted laser light reaches about 3 gigawatts in the oscillated pulse.

In a case of forming, for example, an ink discharge port of an ink jet recording head by the conventional ablation working method utilizing an excimer laser, the optical energy absorbed by a resin plate employed for forming the discharge port is partly converted into thermal energy because of a long oscillated pulse duration of the irradiating laser light, and such thermal energy diffuses with a certain thermal conductivity in the entire resin plate, thereby causing thermal expansion. The expansion increases with the progress of the etching process, whereby the nozzles are deflected to the outside and the nozzle edge sags so that the ink droplets cannot be discharged in a parallel and straight manner.

On the other hand, according to the constitution employing the above-mentioned femtosecond laser having a pulse radiation time not exceeding 1 picosecond, in the laser working the energy density in time can be drastically increased, so that ablation working of the article composed, for example, of a resinous material can be carried out with a very low optical energy.

In the above-described constitution, since the by-products are scarcely generated in the laser working, the conventionally unavoidable step of removing the by-products can be omitted, so that the productivity of the ink jet recording head can be remarkably improved.

In the above-described configuration, since the working can be completed before the optical energy of the laser light irradiating the article is converted into thermal energy and accumulated in the article, the problems of thermal expansion in the course of laser working, resulting in deterioration of the working precision, or partial melting can be solved, whereby the highly precise working is made possible and the performance of the ink jet recording head can be drastically improved. For example, when forming the ink discharge ports according to such constitution, can be formed discharge ports arranged with a high density in parallel, thereby obtaining the ink jet recording head capable of discharging ink droplets in a straight and parallel manner.

The laser having the pulse radiation time not exceeding 1 picosecond is generally formed in a solid state and is only available with a single or low-numbered lateral oscillation mode, so that the reflection of a fine mask pattern results in a speckle interference in the projected image.

In order to avoid such drawback, the above-described configuration of the present invention is applied to dynamically change the speckle interference image formed on the surface of the article and to form an integrated image of such a speckle interference image, whereby a pattern substantially same as the mask pattern can be formed.

In a specific embodiment of such a constitution, the mask for reflecting such a pattern is displaced and vibrated in the direction of optical axis by a vibration actuator as explained in the foregoing to dynamically change the speckle interference pattern and to process the article according to the integrated image formed by the displacement vibration of the mask from the projected image of the mask pattern in which the speckle interference is brought about, whereby a pattern substantially the same as the mask pattern can be obtained.

In another specific embodiment of such a constitution, a wavelength plate with a gradation of at least from $0\lambda$ to $\lambda/2$ is inserted between the mask and the projection lens or between the projection lens and the article and the laser irradiation is carried out while the wavelength plate is moved so as to vary the polarization state as explained in the foregoing, thereby dynamically changing the speckle interference pattern and processing the article according to the integrated image formed by the displacement vibration of the mask from the projected image of the mask pattern in which the speckle interference is brought about, whereby a pattern substantially same as the mask pattern can be obtained.

In the following, embodiments of the present invention will be explained with reference to the accompanying drawings, but the present invention is by no means limited by such embodiments.

Embodiment 1

In the embodiment 1, as the laser oscillator, a laser having a pulse radiation time not exceeding 1 picosecond was used. Specifically, an emitted laser light was a near infrared ray with a wavelength of 775 nm, its irradiation pulse duration was 150 femtosecond/pulse and its radiation energy was 15 $\mu$J/pulse. As the main body of the ink jet recording head, used was an orifice plate made of polysulfone with a thickness of 50 $\mu$m, in which the ink discharge ports were formed.

FIG. 1 is a schematic view showing the optical path of a photomask pattern projecting optical system of a laser working apparatus of the present invention.

A light beam 101 emitted from a laser device (not shown) is guided to an optical integrator 110 consisting for example of a fly's eye lens to divide the incident laser beam into a plurality of beams, and thus divided light beams are superposed by a field lens 111 on a photomask 1 having a pattern of a plurality of apertures formed at a predetermined pitch, adjusting the illumination intensity of the laser to be substantially uniform on the photomask.

The field lens 111 forms a Koehler illumination system for reflecting an image of points focused by the fly's eye lens 110 onto an aperture 112 of a photomask pattern projecting lens 113.

In such an optical system, the laser light illuminates the photomask 1, and the mask pattern formed thereon is focused and reflected by the projection lens 113 onto the surface of an orifice plate 2 of an ink jet head 3, which is a workpiece, whereby the ink discharge ports are formed therein by the laser oscillation.

In this operation, if the mask pattern is simply reflected onto the orifice plate, because the irradiated laser light is coherent in a laterally single mode, the lights diffracted by passing through the mask pattern mutually interfere to cause a speckle interference in the optical image of the mask pattern reflected on the surface of the orifice plate, whereby the orifice plate cannot be worked in a shape corresponding to the mask pattern.

In order to avoid such a phenomenon, a vibrator 5 is maintained in contact, either directly or indirectly, with the mask plate 1 to vibrate and displace the mask plate (on photomask) 1 in the direction of the optical axis during the laser working process. Thus the light diffracted by passing the mask pattern is changed in its phase, diffraction position and diffraction intensity, so that the speckle interference image of the mask pattern reflected on the orifice plate shows a dynamic change with time.

Since the working of the orifice plate is not completed by the laser irradiation of one pulse but by the laser irradiation of from several hundred to several thousand pulses, an integrated image of the speckle interference image is formed which is dynamically changed with the displacement of the mask plate, and the finally worked shape follows the integrated image which is substantially the same as the mask pattern.

For the specific working conditions, the vibration frequency of the mask plate 1 vibrated by the vibrator 5 was 10 Hz, the amplitude of vibration of the mask plate 1 was about 5 μm, and the illumination cycle of the pulsing laser light was 1000 Hz. Thus the orifice plate 2 is irradiated with the laser light in 100 different interference states during one cycle of the vibrating displacement of the mask plate 1. On the other hand, the orifice plate 2 in which the ink discharge ports 21 are formed has a thickness of 50 μm, and the working depth of the laser irradiation is about 0.1 μm per pulse, so that the laser irradiation of at least 500 pulses is required to form the penetrating hole of the ink discharge port 21.

Therefore, the penetrating hole of the ink discharge port 21 is formed by 5 repeated cycles of 100 different interference states, so that such interference patterns are integrated and the completed shape of the ink discharge port 21 faithfully reproduces the mask pattern.

Embodiment 2

In the following an embodiment 2 of the working method for the discharge port of the present invention will be explained. A laser used in this embodiment was similar to that in the embodiment 1 for forming the ink discharge ports in an orifice plate of the main body of the ink jet recording head, the orifice plate being made of polysulfone with a thickness of 50 μm.

Figure 2:
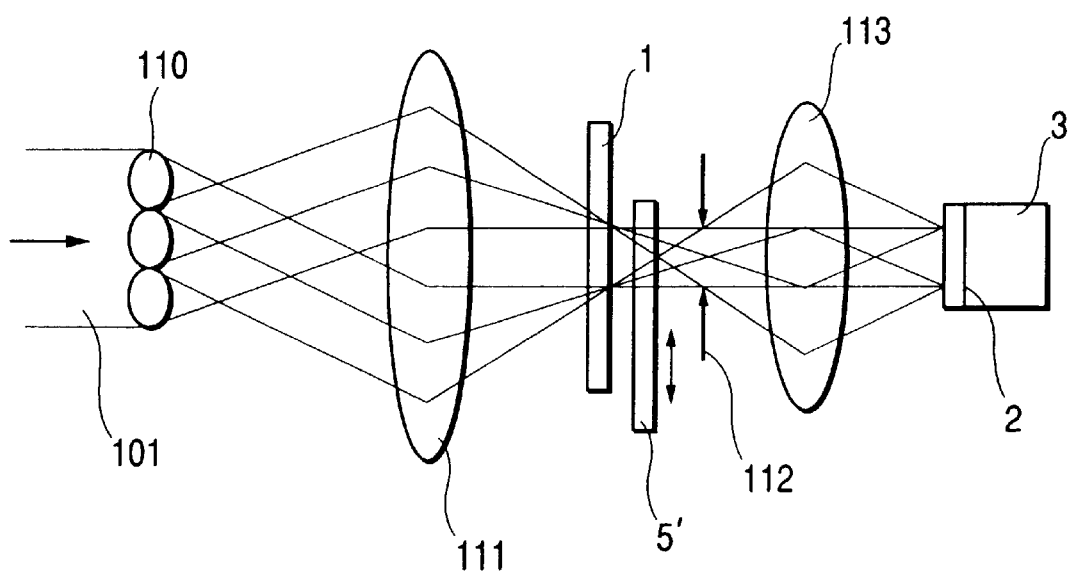
FIG. 2 is a schematic view showing the optical path of a photomask pattern projecting optical system in a laser working apparatus in an embodiment 2 of the present invention.

FIG. 2 is a schematic view showing the optical path of a mask pattern projecting optical system of a laser working apparatus of the present invention.

A light beam 101 emitted from a laser device (not shown) is guided to an optical integrator 110 consisting, for example, of a fly's eye lens to divide the incident laser beam into plural beams, and thus divided light beams are superposed by a field lens 111 on a mask 1 having a pattern of a plurality of apertures formed at a predetermined pitch, thereby adjusting the illumination intensity of the laser substantially to be uniform on the mask.

The field lens 111 forms a Koehler illumination system for projecting an image of plural points condensed by the fly's eye lens 110 onto an aperture 112 of a mask pattern projecting lens 113.

In such optical system, the laser light illuminates the mask 1, and the mask pattern formed thereon is focused and reflected by the projection lens 113 onto the surface of the orifice plate 2 of the ink jet recording head 3, which is a workpiece, whereby the ink discharge ports are formed therein by the laser oscillation.

In this operation, if the mask pattern is simply reflected onto the orifice plate, because of the irradiating laser light is coherent with a laterally single mode, the lights diffracted by passing through the mask pattern mutually interfere to cause a speckle interference in the optical image of the mask pattern reflected on the surface of the orifice plate, whereby the orifice plate cannot be worked in a shape corresponding to the mask pattern.

Figure 3:
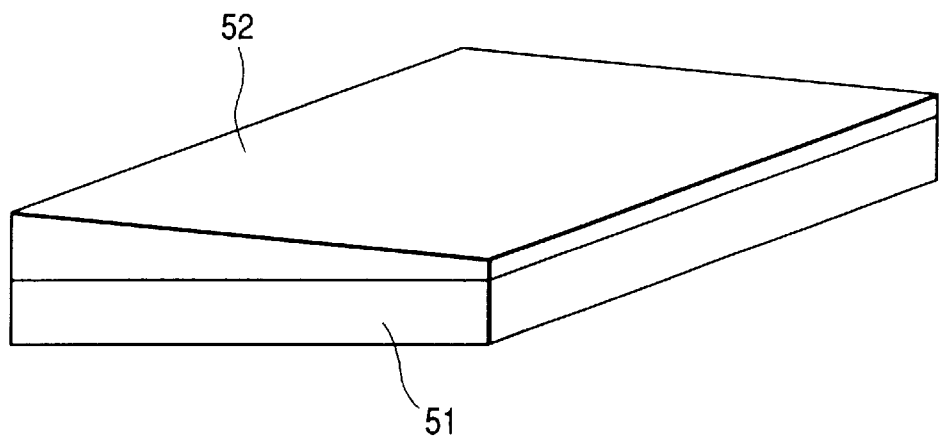
FIG. 3 is a view showing the configuration of a gradient deflection wavelength plate to be employed in the laser working apparatus in the embodiment 2 of the present invention.

In order to avoid such a phenomenon, a wavelength plate 5', prepared by forming rock crystal 52 with a inclined thickness on a quartz substrate 51 as shown in FIG. 3, is inserted between the mask plate 1 and the projection lens 113 as shown in FIG. 2, and such a inclined polarization wavelength plate is displaced as indicated by an arrow in the course of the laser working process.

Thus the light diffracted by passing the mask pattern is changed in its phase, diffraction position and diffraction intensity, so that the speckle interference image of the mask pattern reflected on the orifice plate shows a dynamic change with time.

Since the working of the orifice plate is not completed by the laser irradiation of one pulse but by the laser irradiation of from several hundred to several thousand pulses, an integrated image of the speckle interference image is formed which is dynamically changed by the above-mentioned wavelength plate 5', and the finally worked shape follows the integrated image which is substantially the same as the mask pattern.

For the specific working conditions, the wavelength plate 5' is provided with a rock crystal layer 52, which is prepared by adhering a rock crystal with birefringent characteristics onto a quartz substrate 51 and polishing the rock crystal layer to give a slope to it so that its thickness gradually changes, and the thickness of such rock crystal layer is so selected as to cause a phase difference of ½ of the laser wavelength of 775 nm with respect to a movement of 2 mm in the inclining direction of the rock crystal layer.

The wavelength plate 5' is moved in the inclining direction of the rock crystal as indicated by an arrow in FIG. 2, at a speed of 8 mm/sec, and the irradiation frequency of the pulsed laser light is 1000 Hz.

On the other hand, the orifice plate 2 in which the ink discharge ports 21 are formed has a thickness of 50 μm, and the working depth of the laser irradiation is about 0.1 μm per pulse, so that the laser irradiation of at least 500 pulses is required to form the penetrating hole of the ink discharge port 21.

Therefore, the formation of the penetrating hole of the ink discharge port 21 requires about 0.5 seconds, during which the wavelength plate 5' moves by 4 mm to generate a phase difference from 0 to 1 wavelength of the laser light passing through the mask pattern, corresponding to a 180° rotation in the polarizing direction. Thus the light diffracted by passing the mask pattern is subjected to changes in the polarizing direction, resulting in changes in the coordination of polarized light waves in the interference, and providing different states of interference. With 500-pulse laser irradiation, the mask pattern is reflected onto the orifice plate 2 in individually different polarization states, and the ink discharge port 21 is formed by the integration of such different polarization states, so that the completed shape of the ink discharge port 21 faithfully reproduces the mask pattern.

In the following, an ink jet recording head to which the discharge port forming methods of the foregoing embodiments 1 and 2 is applied will be explained with reference to FIGS. 4A to 4C.

Figure 4A:
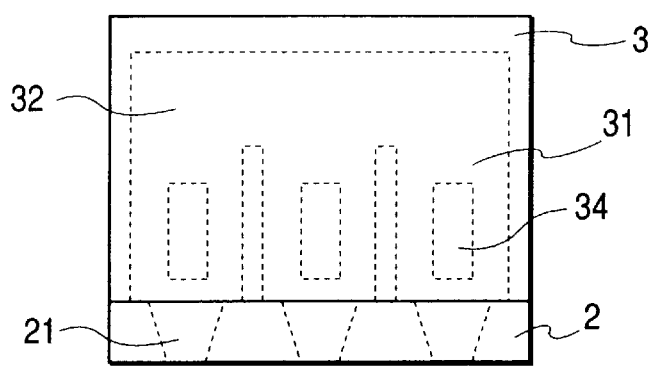
FIGS. 4A, 4B and 4C are schematic views showing an ink jet head produced by the ink jet head producing method to which the embodiments 1 and 2 of the working method in the present invention are applied.
Figure 4B:
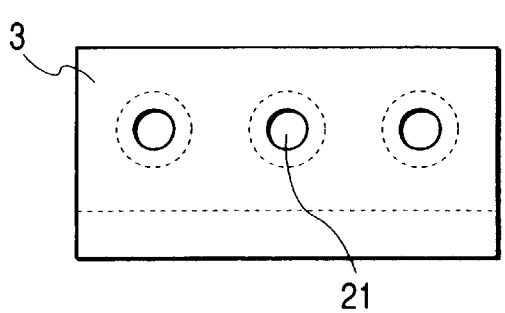
Figure 4C:
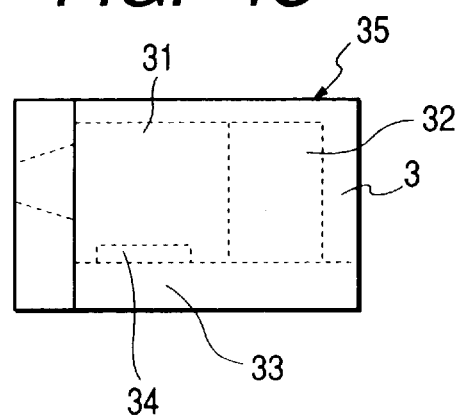

Referring to FIGS. 4A to 4C, a base plate 33 is provided thereon with an ink discharge pressure generating element 34 such as an electrothermal converting element or an electromechanical converting element for ink discharge.

The ink discharge pressure generating element 34 is provided in an ink flow path 31 communicating with a discharge port 21, and the individual ink flow paths 31 communicate with a common liquid chamber 32, which is connected to an ink supply pipe (not shown) for supplying ink from an ink tank.

A top plate 35 is provided with recesses for forming the ink flow paths 31 and the common liquid chamber 32, and forms such ink flow paths 31 and common liquid chamber 32 upon being adjoined to the base plate 33.

At the end of the ink flow paths in the adjoined body constituted of the base plate 33 and the top plate 35, an orifice plate 2 having ink discharge ports 21 is provided.

The above-described ink jet head can be prepared in the following manner.

At first the base plate 33 is prepared by patterning heaters 34 constituting the heat generating resistance elements for generating the ink discharge pressure, integrated circuits (not shown) such as shift registers and electric wiring on a silicon substrate, and the top plate 35 is prepared by forming the recesses to form the ink flow paths 31 and the ink chamber 32 and an ink supply aperture (not shown) by chemical etching of a silicone plate.

Then the base plate 33 and the top plate 35 are aligned and adjoined in such a manner that the end faces at the ink discharge side mutually coincide and that the array of the ink flow paths 31 coincides with that of the heaters 34.

Then the orifice plate 2 in which the nozzles (discharge ports) are not formed is adhered to the end faces, at the ink discharge side, of the adjoined top plate and base plate, and the nozzles are formed in this state by the nozzle working method explained in the foregoing.

Then an electric board on which terminals (not shown) for driving the heaters are patterned is connected, and an aluminum base plate is adjoined to the base plate 33. The ink jet head is obtained by combining a holder for supporting the components and an ink tank for supplying ink.

The above-described preparation of the ink jet recording head can prevent fluctuation in the ink discharging direction and position, caused by uneven working in the direction of the discharge ports.

In the present embodiment, 50 units of the ink jet recording head were prepared and subjected to the observation of the shape of the discharge ports. All the discharge ports showed clean edges and were aligned in parallel with a high density, and the fluctuation in the aperture diameter at the ink discharging end in these discharge ports was significantly reduced in comparison with ones prepared in the conventional manner. Also in the actual printing operation, these ink jet recording heads recorded uniformly aligned print dots with a neat circular dot shape, thereby providing an image with an excellent print quality.

In the foregoing, examples of the method for forming ink discharge port has been explained, but the present invention is not limited to such a case and is applicable to the preparation of an ink flow path, an ink chamber or an ink supply aperture with the same advantages.

Also in the foregoing the present invention has been explained with its application to the ink jet recording head, but the present invention is not limited to such a case and advantageously applicable to the laser working in the micromachining of a semiconductor substrate or the like, and the present invention also includes such cases.

As explained in the foregoing, the present invention is capable of applying a higher definition, eliminating the generation of by-products, fundamentally avoiding the accumulation of thermal energy generated in the course of laser working in the worked article composed, for example, of a resinous material, and precisely reproducing the fine mask pattern in the mask projection working. In addition, the present invention allows energy density in time in the laser working to significantly increase, thereby enabling the article composed, for example, of a resinous material to be ablated with very small optical energy.

According to the present invention, the by-products in the laser working are scarcely generated, so that the conventionally indispensable step for eliminating the by-products can be omitted. By applying the present invention to the producing method for the ink jet recording head, the productivity of the ink jet head can be significantly improved.

According to the present invention, the working can be completed before the optical energy of the laser light irradiating the article composed, for example, of a resinous material is converted into thermal energy and accumulated in the article, so that the article can be made free from drawbacks of thermal expansion in the course of working to lower the working precision or partial fusion. Therefore highly precise working is made possible to significantly improve the performance of the ink jet head.

Also the ablation working without passing through the liquid phase state can be realized not only in resinous materials but also in materials with a high thermal conductivity such as ceramics or metals, since the working process is completed before the thermal diffusion takes place after the light irradiation.

In addition, the ablation working can be realized in materials with a high optical transmittance such as quartz, optical crystals or glass, utilizing even the slight light absorbance because the energy is highly concentrated in time. Accordingly, the freedom of the selection of materials for the ink jet recording head can be enlarged Therefore, high temperature treatment, etc. can be applied to water-repellent treatment of the surfaces of ink discharge ports.

Further, the present invention enable material with a small linear expansion coefficient to be used, thereby inhibiting deviation due to the shearing force from occurring at the adjoining faces of components. The use of ceramics or glass make it possible to produce an ink jet head excellent in durability and storage properties capable of withstanding strongly alkaline ink, and the use of a semiconductive material allows a structure to be formed directly on integrated circuits.

What is claimed is:

1. A laser working method for carrying out laser ablation working on an article by irradiating the article with laser light, which comprises:

in working by projecting said laser light on a mask pattern, employing said laser light in a plurality of pulses having a very high energy density in space and time, as emitted from a laser oscillator that can oscillate with a pulse radiation time not exceeding 1 picosecond;

dynamically changing a speckle interference image generated by light diffraction at the passing of said laser light through said mask pattern, thereby forming an integrated image of said speckle interference image; and producing a pattern substantially the same as the mask pattern.

2. A laser working method according to claim 1, wherein said mask is displaced and vibrated in the direction of the optical axis to form the integrated image of said speckle interference image on a surface of the article.

3. A laser working method according to claim 2, wherein the displacement vibration of said mask is effected by a vibration actuator.

4. A laser working method according to claim 1, wherein the integrated image of said speckle interference image is formed on the surface of the article, by inserting a wavelength plate having a slope of at least from $0\lambda$ to $\lambda/2$ between said mask and a projection lens or between said projection lens and said article and carrying out laser irradiation while moving the wavelength plate so that light polarization is changed.

5. A laser working method according to any one of claims 1 to 4, wherein a wavelength of said laser light is within a range of from 350 to 1000 nm.

6. A laser working method according to any one of claims 1 to 4, wherein a pulse radiation time of said laser light is not more than 500 femtoseconds.

7. A laser working method according to any one of claims 1 to 4, wherein said article is composed of a resinous material, Si or a Si compound.

8. A laser working method according to any one of claims 1 to 4, wherein said laser oscillator is provided with a light propagation space compressing device.

9. A laser working method according to claim 8, wherein said light propagation space compressing device is composed of a chirping pulse generation means and a vertical mode synchronization means utilizing light wavelength dispersion characteristics.

10. A method for producing an ink jet recording head comprising an ink discharge port for discharging an ink droplet to be deposited on a recording medium, a liquid chamber containing ink to be supplied to the ink discharge port, an ink flow path for communicating the liquid chamber with the discharge port, an energy generation element provided in a part of the ink flow path and generating energy for ink discharge, and an ink supply aperture for supplying ink from the outside to the liquid chamber, in which a member constituting at least a part of an ink passage of the ink jet recording head is worked by laser light, said method comprising the following steps:

in working by projecting the laser light on a mask pattern, employing the laser light in a plurality of pulses having a very high energy density in space and time, as emitted from a laser oscillator that can oscillate with a pulse radiation time not exceeding 1 picosecond; and dynamically changing a speckle interference image generated by light diffraction at the passing of the laser light through the mask pattern, thereby forming an integrated image of the speckle interference image, whereby a pattern substantially the same as the mask pattern is produced.

11. A method for producing an ink jet recording head according to claim 10, wherein said mask is displaced and vibrated in the direction of the optical axis to form the integrated image of said speckle interference image on a surface of said ink jet recording head.

12. A method for producing an ink jet recording head according to claim 11, wherein the displacement vibration of said mask is effected by a vibration actuator.

13. A method for producing an ink jet recording head according to any one of claims 10 to 12, wherein a plurality of recesses or penetrating holes constituting a part of the ink passage are formed simultaneously at a predetermined distance by laser light irradiation through a mask with a pattern having a plurality of apertures formed with a predetermined pith.

14. A method for producing an ink jet recording head according to claim 13, wherein the ink jet recording head comprises a plurality of ink discharge ports, a plurality of ink flow paths, and a plurality of energy generation elements, and the recesses are grooves to form the ink flow paths.

15. A method for producing an ink jet recording head according to claim 13, wherein the ink jet recording head comprises a plurality of ink discharge ports, a plurality of ink flow paths, and a plurality of energy generation elements, and the penetrating holes are to form the discharge ports.

16. A method for producing an ink jet recording head according to any one of claims 10 to 12, wherein the wavelength of said laser light is within a range of from 350 to 1000 nm.

17. A method for producing an ink jet recording head according to any one of claims 10 to 12, wherein a pulse radiation time of said laser light does not exceed 500 femtoseconds.

18. A method for producing an ink jet recording head according to any one of claims 10 to 12, wherein a member constituting at least a part of the ink passage including said discharge port, ink flow path, liquid chamber and ink supply aperture is composed of a resinous material.

19. A method for producing an ink jet recording head according to any one of claims 10 to 12, wherein a member constituting at least a part of the ink passage including said discharge port, ink flow path, liquid chamber and ink supply aperture is composed of Si or an Si compound.

20. A method for producing an ink jet recording head according to any one of claims 10 to 12, wherein said laser oscillator is provided with a light propagation space compressing device.

21. A method for producing an ink jet recording head according to claim 20, wherein said light propagation space compressing device is composed of a chirping pulse generation means and a vertical mode synchronization means utilizing light wavelength dispersion characteristics.

22. A method for producing an ink jet recording head according to claim 10, wherein the integrated image of said speckle interference image is formed on the surface of said ink jet recording head, by inserting a wavelength plate having a slope of at least from $0\lambda$ to $\lambda/2$ between said mask and a projection lens or between said projection lens and said ink jet recording head and carrying out laser irradiation while moving said wavelength plate so that light polarization is changed.

* * * * *

UNITED STATES PATENT AND TRADEMARK OFFICE
CERTIFICATE OF CORRECTION

PATENT NO. : 6,529,228 B1
DATED : March 4, 2003
INVENTOR(S) : Jun Koide

It is certified that error appears in the above-identified patent and that said Letters Patent is hereby corrected as shown below:

Title page,
Item [75], Inventor, "June Koide, Tokyo (JP)" should read
-- Jun Koide, Tokyo (JP) --.

Column 2,
Line 66, "-object" should read -- object --.

Column 12,
Line 22, "enlarged"should read -- enlarged. --.

Column 13,
Line 50, "pith" should read -- pitch --.

Signed and Sealed this

First Day of June, 2004

JON W. DUDAS
*Acting Director of the United States Patent and Trademark Office*